United States Patent [19]

Perkins

[11] 4,298,886
[45] Nov. 3, 1981

[54] AUTOMATIC PEAK BEAM CURRENT LEVELER SYSTEM

[75] Inventor: Geoffrey W. Perkins, Geneva, Switzerland

[73] Assignee: Motorola Inc., Schaumburg, Ill.

[21] Appl. No.: 102,685

[22] Filed: Dec. 12, 1979

[51] Int. Cl.$^3$ .............................................. H04N 5/68
[52] U.S. Cl. ...................................... 358/74; 358/34; 358/243
[58] Field of Search ................... 358/74, 243, 34, 171; 315/379

[56] References Cited

U.S. PATENT DOCUMENTS

| | | | |
|---|---|---|---|
| 3,855,614 | 12/1974 | Okada | 358/74 |
| 3,898,381 | 8/1975 | Amsen | 358/74 |
| 3,927,346 | 12/1975 | Spaanhake | 358/74 |
| 4,017,681 | 4/1977 | Smeulers | 358/243 |
| 4,081,838 | 3/1978 | Wheeler | 358/243 |
| 4,121,252 | 10/1978 | Saiki | 358/243 |

Primary Examiner—Jin F. Ng
Assistant Examiner—Michael A. Masinick
Attorney, Agent, or Firm—Michael D. Bingham

[57] ABSTRACT

A peak beam current leveler for use in a television receiver system which is responsive to the magnitude of the beam current supplied to the cathode of the cathode ray tube (CRT) exceeding a predetermined peak level to adjust the cathode peak beam current accordingly. The cathode beam current is supplied by a gain controlled video amplifier to the cathode through the base-emitter junction of a transistor. The collector electrode of the transistor is connected with a resistor for providing a voltage level proportional to the peak beam cathode current. A comparator circuit is utilized to provide a gain control signal that controls the gain of the gain controlled video amplifier such that the higher the beam current the more gain reduction that occurs. Thus, the level of the peak current is automatically reduced to maintain good focusing of the display on the CRT.

10 Claims, 2 Drawing Figures

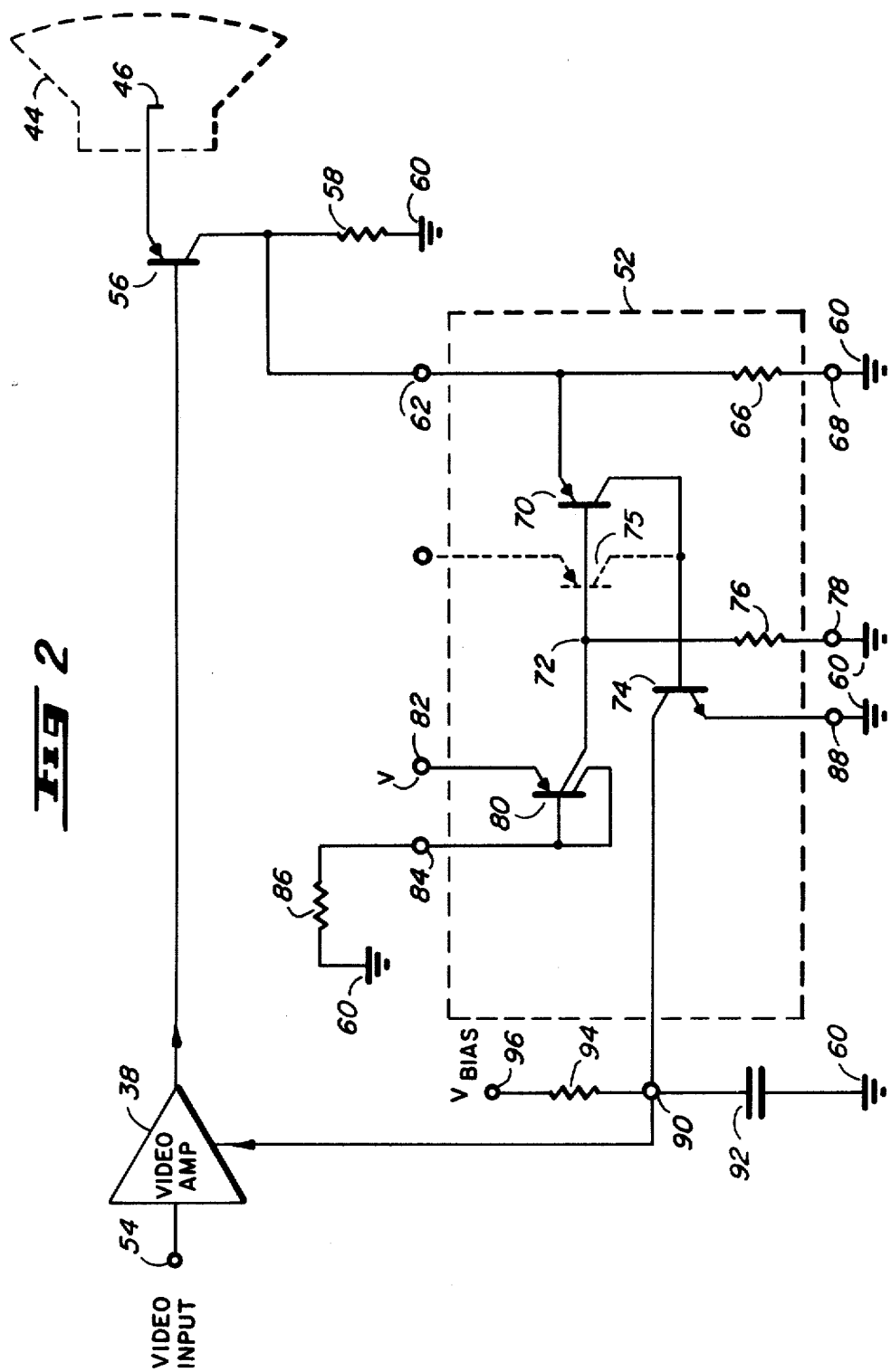

AUTOMATIC PEAK BEAM CURRENT LEVELER SYSTEM

This invention relates to a control circuit for automatic adjustment of the peak beam current and more particularly to a control circuit for automatically adjusting the peak beam cathode current in a television receiver or a similar apparatus of the type having a display tube to which a video signal is supplied.

Excessive beam currents can cause the cathode ray tube (CRT) of a television receiver to produce a degraded image. For example, in a conventional system for driving the picture tube, a voltage amplifier drives the cathode of the picture tube directly. During the picture display periods of the television signal the instantaneous amplitude of the beam current may rise beyond the level at which it remains in reasonable focus because of limitations in the performance of the electron gun assembly. Displayed captions, for example, can become illegible as a result of this poor focusing.

Many circuits for automatically controlling the beam current have been suggested in the prior art. Quite a few of these prior art systems control excessive beam current by responding to the average beam current. In this type of system the full dynamic range of the television tube cannot be used since the average value of the beam current must be set where the peak beam current does not effect the focus of the tube. However, the present invention comprises circuitry for controlling the peak beam current wherein the average beam current can be adjusted to the full value which is just below the value that would damage the television tube. Thus, a brighter average television picture can be displayed on the television tube.

Another problem with some prior art beam leveler circuits is that detection of the cathode current occurs during the horizontal retrace intervals wherein the video signal corresponds to the black level. This results in a disadvantage because the detected level of the cathode current is defined relative to the actual black level of the video signal. Moreover, it is not unusual to have detection during the horizontal retrace interval manifest itself as a light track on the screen and thus disturb the picture, at least in dark surroundings. Moreover, since detection of the beam current occurs during the previous retrace interval, instantaneous and automatic adjustment of the cathode current is not provided by these systems but rather is delayed to the next trace and retrace interval.

Thus, there is a need for a system for overcoming the limitations of the prior art. Accordingly, the present invention disclosed hereinafter comprises a method and system to eliminate deficiencies in the prior art by detecting instantaneously the peak level of the beam current when it increases beyond a predetermined level, which level is fixed at a point beyond which the beam begins to become poorly focused. Therefore, the level of the peak beam current is automatically reduced to a maximum permissible level for good focus.

SUMMARY OF THE INVENTION

It is an object of the present invention to provide a method and circuit for automatically adjusting the peak beam current in a video display system.

It is another object of the present invention to provide a beam current control system that adjusts the peak beam current automatically by changing the level of the drive signal between the cathode and final anode of a cathode ray display tube.

Still another object of the present invention is to provide an automatic beam current leveler for a television circuit which detects the instantaneous peak beam cathode current and adjusts the same automatically to a predetermined fixed level.

In accordance with the above and other objects there is provided a peak beam current leveler for detecting the instantaneous peak level of the beam current in a cathode ray tube display system and for automatically adjusting the level thereof to a predetermined level that is fixed at a point beyond which the beam begins to become poorly focused. The peak beam current leveler comprises means for instantaneously detecting the level of the beam cathode current and for comparing the same to a predetermined fixed threshold level. The peaks of the beam current that pass above said threshold level produce a gain control output signal for varying the gain of a gain controlled amplifier, which provides said beam current, in such a manner as to maintain the peak level of the beam current signal at a level below said predetermined threshold level. Thus, the present invention automatically adjusts the instantaneous level of the peak beam current to maintain good focus in the video display system.

BRIEF DESCRIPTION OF THE DRAWINGS

FIG. 2 is a schematic diagram illustrating the peak beam leveler circuit of the present invention.

DETAILED DESCRIPTION OF THE PREFERRED EMBODIMENT

Figure 1:
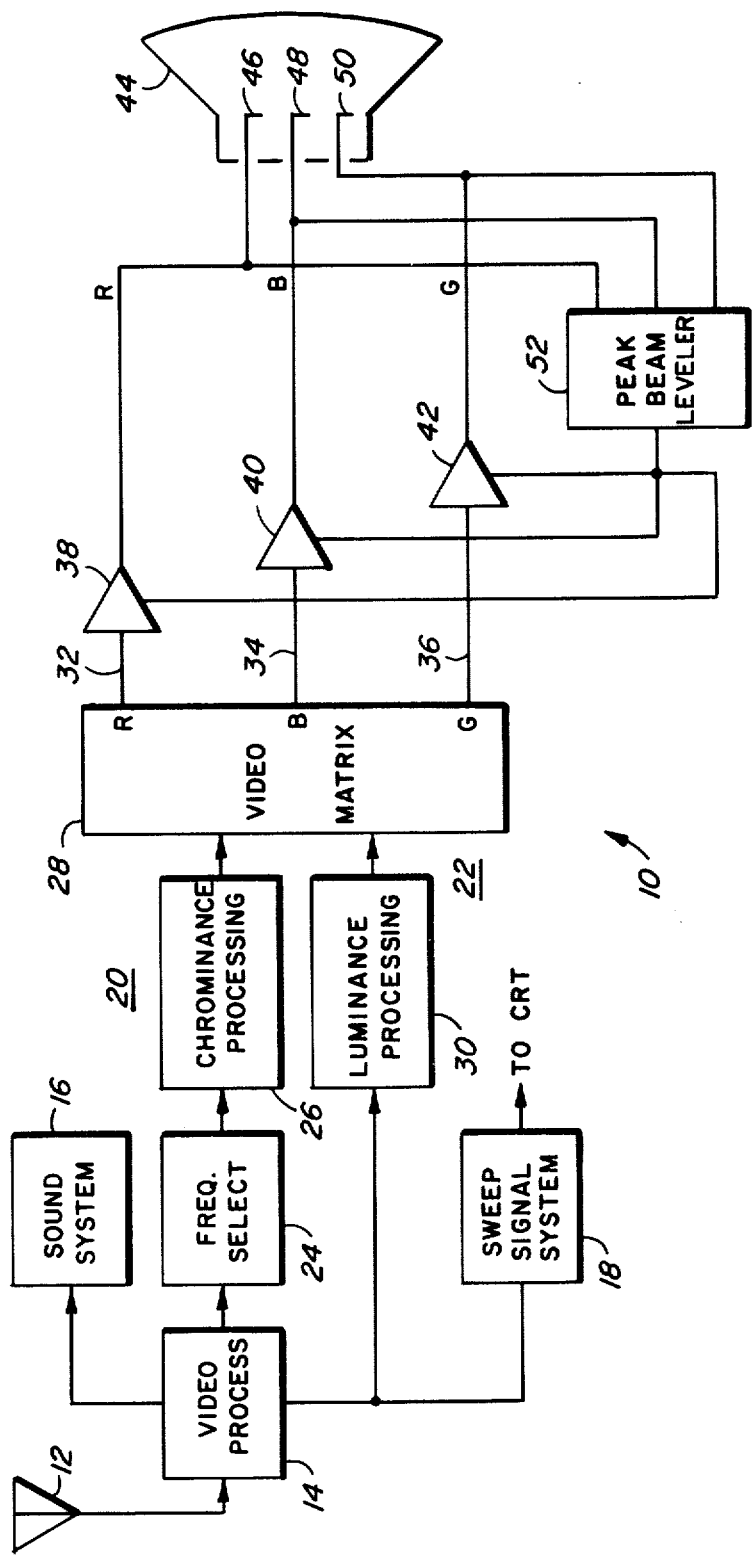
FIG. 1 is a block diagram of a color television receiver including a peak beam leveler circuit of the embodiment of the invention.

FIG. 1 illustrates in block diagram form a general arrangement of color television receiver 10 employing the circuit of the preferred embodiment of the present invention. As shown, a radio frequency composite television signal is received at antenna 12 and is supplied to video processing circuit 14. As is understood, video processing circuit 14 generates a plurality of output signals which are utilized to provide an audio output from sound system 16, synchronizing components to sweep signal system 18, and a composite video signal containing chrominance and luminance components which are applied to the chrominance and luminance processing channels of the television, respectively. Thus, an output of video processing circuit 14 is provided to chrominance channel 20 and to luminance channel 22 as is known to those familiar to the art.

Chrominance channel 20 includes a frequency selection unit 24 for selectively coupling the chrominance component to chrominance processing unit 26 for deriving the R-Y, B-Y and G-Y color difference signals as is known. These color difference signals are then combined in video matrix circuit 28 with a luminance signal Y supplied from luminance channel 22 to produce the red, blue and green color signals in the television receiver.

A luminance processing circuit 30 of luminance channel 22 serves to amplify and otherwise process the luminance component of the composite video signal to supply the luminance signal Y to video matrix 28.

The individual red, blue and green color signals derived at respective outputs of video matrix 28 may be supplied over respective conductors 32, 34 and 36 to individual video amplifiers 38, 40, and 42. The amplified color signals are coupled from the outputs of video amplifiers 38, 40, and 42 to the respective cathodes of cathode ray tube 44 to generate the color television signals.

In the preferred embodiment of the present invention, the instantaneous peak beam current associated with each cathode 46, 48 and 50 is detected by peak beam leveler circuit 52 to derive an output control signal to adjust the gain of gain controlled video amplifiers 38, 40 and 42 as will be hereinafter explained in greater detail.

Turning to FIG. 2 there is shown peak beam leveler circuit 52 of the present invention. It is to be understood that peak beam current leveler circuit 52 may be utilized in both monochrome and color television receivers in the preferred embodiment. Therefore, although the following description for the operation of peak beam leveler circuit 52 is in conjunction with the color television receiver 10 shown in FIG. 1 it is to be realized that in a monochrome television receiver system a single gain control video amplifier could be controlled to adjust the peak beam current passing through to the cathode of the cathode ray tube supplied in such a television receiver as is shown in FIG. 2. As illustrated in FIG. 2, peak beam current leveler circuit 52 is shown coupled to only one cathode of the cathode ray tube 44. It is to be understood that components in FIG. 2 corresponding to those in FIG. 1 are referenced by the same reference numerals.

For illustration purposes peak beam current leveler circuit 52 is shown coupled with one of the video amplifiers which may for instance be video amplifier 38 of FIG. 1. In this example then the cathode of cathode ray tube 44 would correspond to cathode 46 of FIG. 1. Hence the video input to amplifier 38 at terminal 54 would correspond to the red color signal. The amplified video signal from gain controlled video amplifier 38 is applied to the base of high voltage PNP transistor 56 which in the preferred embodiment would be an external transistor: peak beam current leveler circuit 52 being shown in dashed outline form to suggest that it is suitable for manufacture in integrated circuit form. The cathode 46 is driven by the emitter follower action of transistor 56 which implies that the emitter of this transistor passes all of the cathode beam current provided by video gain controlled amplifier 38. It is also assumed that the collector current of transistor 56 is substantially equal to the emitter current such that the total beam cathode current is produced at the output of the collector of transistor 56. The collector of transistor 56 is shown as being connected to an external resistor 58 which is returned to ground reference terminal 60 and also to terminal 62 of beam current leveler circuit 52. Terminal 62 is connected at node 64 to an internal resistor 66 which is returned to ground reference terminal 60 at terminal 68. The emitter electrode of internal PNP transistor 70 is connected to terminal 64. The base of transistor 70 is connected at terminal 72 to a voltage reference potential with the collector thereof being connected to the base of NPN transistor 74. If peak beam current leveler circuit 52 is to be incorporated into the color television receiver 10 two additional transistors having their base and collector electrodes coupled in parallel with the base and collector electrodes of transistor 70 would be provided with their respective emitter electrodes being coupled to respective external PNP transistors in the same manner as shown for transistor 70 and transistor 56. One such additional transistor 75 is shown in phantom form. As an example, the emitter of transistor 75 would be connected to the collector of an external PNP transistor in the same manner shown for transistor 70. In this configuration, peak beam current leveler circuit 52 would be continuously sampling the instantaneous peak beam cathode currents in all three cathodes of the color televison receiver.

The aforementioned voltage reference potential supplied at terminal 72 is established across resistor 76 which is connected between terminal 72 and terminal 78 at which is supplied ground reference potential 60. The magnitude of the voltage reference potential supplied at terminal 72 is set by the collector current of multiple collector PNP transistor 80 which has the emitter thereof connected at terminal 82 to a source of operating potential V and one collector connected to terminal 72. The other collector of transistor 80 is coupled with its base to terminal 84. An external bias resistor 86 is connected between ground reference 60 and terminal 84. In the system, the magnitude of the voltage reference potential appearing at terminal 72 can be adjusted by changing the value of external bias resistor 86.

The base electrode of transistor 74 is connected in series with the collector of transistor 70. The emitter electrode of this transistor is connected to terminal 88 to ground reference 60. The collector of transistor 74 is coupled to output terminal 90 of peak beam current leveler circuit 52. An external integrating circuit comprising capacitor 92 and resistor 94 coupled in series with each other with the common junction therebetween being connected to terminal 90. A bias potential, V bias, is supplied at terminal 96 to resistor 94. Terminal 90 is shown as being connected to the gain control terminal of video amplifier 38 such that any control signals generated at terminal 90 will adjust the gain of the video signal appearing at the output of video amplifier 38 accordingly.

In operation, the beam current in each cathode of cathode ray tube 44 is monitored by a respective transistor 56. The peak beam cathode current appearing as the collector current of transistor 56 produces a voltage across resistor 66 which appears at terminal 64 and is applied to the emitter of transistor 70. If the magnitude of the voltage at terminal 64 becomes greater than the magnitude of the voltage reference appearing at terminal 72 plus the base-to-emitter voltage of transistor 70, the excess peak beam current will be passed through the emitter of transistor 70 to render transistor 74 conductive. Thus, the excess peak beam current produces collector current in transistor 74 which is integrated by the resistance-capacitor network. This signal then appears as an output control signal from peak beam current leveler circuit 52 to control the gain of gain controlled video amplifier 38 such that the higher the peak beam current the more gain reduction occurs through video amplifier 38.

Additionally, it is to be recognized that peak beam leveler circuit 52 may be utilized to control the average beam current by integrating the collector current of transistor 56 in addition to integrating the collector current of transistor 74. Hence, the voltage appearing at the collector of transistor 74 could then control automatically the brightness of the displayed picture appearing on cathode ray tube 44.

What has been described above then is a novel peak beam current leveler circuit suitable for use in a television receiver for sampling the instantaneous peak beam cathode current in the cathode ray tube of the television receiver. The sampled peak beam current is utilized to produce a voltage which is compared with a reference voltage to produce a control voltage for automatically adjusting the level of the peak beam current if its magnitude should be in excess of a predetermined level.

I claim:

1. Apparatus for automatically adjusting the peak beam cathode current conducted through a cathode ray tube of a video display system, comprising:

means receiving a video signal for producing cathode beam current in the video display system;

means coupled with said cathode beam current producing means which is responsive to the instantaneous peak magnitude of the beam current exceeding a predetermined level for generating an output signal at an output thereof that is supplied to said cathode beam current producing means to automatically adjust the magnitude of the cathode beam current produced therefrom including a gain-controlled amplifier having an input, output, and gain control terminals, said gain control terminal being coupled to said output of said means for generating an output signal, said input terminal being coupled to a source supplying said video signal, the gain of said gain controlled amplifier being varied in response to said output signal whereby the magnitude of the video signals appearing at the output terminal of said gain-controlled amplifier is adjusted accordingly; and transistor means having first, second and control electrodes, said control electrode being coupled to said output terminal of said gain controlled amplifier, said first electrode being coupled to the cathode of the cathode ray tube, said second electrode being coupled to said means for generating an output signal.

2. The apparatus of claim 1 wherein said means for producing an output signal includes:

means coupled to said second electrode of said electron control means for producing a bias potential at an output thereof the magnitude of which is a function of the instantaneous magnitude of the cathode beam current;

comparator means receiving a threshold reference potential for producing a control signal at an output thereof when the magnitude of said bias potential exceeds said threshold reference potential, said comparator means having an input coupled to said output of said bias potential producing means; and integrating circuit means connected with said output of said comparator means to said gain control terminal of said gain-controlled amplifier for producing said output signal to vary the gain of said gain-controlled amplifier.

3. The apparatus of claim 2 wherein said comparator means includes:

first transistor means having first, second, and control electrodes, said first electrode being connected to said input of said comparator means, said control electrode receiving said threshold reference signal; and second transistor means having first, second and control electrodes, said first electrode being connected to a terminal at which is supplied a ground reference potential, said second electrode being coupled to said output of said comparator means, and said control electrode being coupled to said second electrode of said first transistor means.

4. The apparatus of claim 3 further including:

third transistor means having first, second and control electrodes, said first electrode being coupled to a terminal at which is supplied an operating potential, said second electrode being coupled to said control electrode of said first transistor means;

first circuit means connected between said control electrode of said third transistor means and a terminal at which is supplied said ground reference potential; and second circuit means connected between said control electrode of said first transistor means and a terminal at which said ground reference potential is supplied.

5. The apparatus of claim 4 wherein said third transistor means includes a third electrode and conductive means for connecting said third electrode to said control electrode of said third transistor means.

6. The apparatus of claim 5 wherein:

said first and third transistor means being PNP transistors; and said second transistor means being an NPN transistor.

7. In a television receiver including beam current producing circuitry producing beam current in a cathode of a cathode ray display tube, a peak beam current leveler system, comprising:

means directly responsive to the instantaneous magnitude of the beam current for providing an output signal when the magnitude of the peak beam current exceeds a predetermined level, and means coupled between said means for providing an output signal and the beam current producing circuit which is responsive to said output signal for producing a signal that is supplied to the beam current producing circuitry to automatically adjust the magnitude of the beam current in the cathode, including means responsive to the beam current for producing a potential having a magnitude which is representative of the instantaneous magnitude of the beam current, means for providing a reference potential of a predetermined magnitude, and comparator means for producing said output signal at an output thereof in response to said potential from said means responsive to the beam current exceeding said reference potential;

said comparator means comprising a first transistor having first, second and control electrodes, said first electrode being coupled to said means for producing a potential representative of the magnitude of the beam current, said control electrode being coupled to said means for providing a reference potential, and a second transistor having first, second and control electrodes, said control electrode being connected to said second electrode of said first transistor, said first electrode being connected to a terminal at which is supplied a ground reference potential, said second electrode being said output of said comparator means; and said means for producing a reference potential including a third transistor having first, second, third and control electrodes, said first electrode being coupled to a bias supply terminal at which is supplied a bias potential, said second electrode being coupled to said control electrode of said first transistor, said third electrode being connected to said control electrode;

a first resistor connected between said control electrode of said third transistor and a terminal at which is supplied said ground reference potential; and a second resistor coupled between the second electrode of said third transistor and a terminal at which is supplied said ground reference potential.

8. In a television including a cathode ray tube having at least one cathode and grid, video signal processing circuit for producing a video signal and a gain controlled amplifier responsive to the video signal for producing beam current between the cathode and grid of the cathode ray tube, a peak beam current leveler system, comprising:

a first transistor having first, second and control electrodes, said first electrode being coupled to the cathode of the cathode ray tube, said control electrode being coupled to an output of the gain controlled amplifier;

means coupled to said second electrode of said first transistor receiving therefrom the beam current for producing a voltage at an output thereof the level of which corresponds to the magnitude of the beam current; and comparator means connected to said output of said voltage producing means for producing a gain control signal when said level of said voltage produced by said voltage producing means exceeds a predetermined threshold level, said gain control signal being applied to the gain controlled amplifier such that the peak beam current is automatically adjusted.

9. The peak beam current leveler system of claim 8 wherein said comparator means includes:

a second transistor having first, second, and control electrodes, said first electrode being connected to said output of said voltage producing means, said control electrode receiving a reference voltage thereat;

a third transistor having first, second and control electrodes, said control electrode being connected to said second electrode of said second transistor, said first electrode being coupled to a terminal at which is supplied a ground reference potential; and integrator means connected to said second electrode of said third transistor for integrating the signal appearing at said second electrode to produce said gain control signal.

10. The peak beam current leveler system of claim 9 wherein said comparator means further includes:

a fourth transistor having first, second, third and control electrodes, said first electrode being connected to a terminal at which is supplied an operating bias potential, said second electrode being coupled to said control electrode of said second transistor, said third electrode being connected to said control electrode;

first resistive means coupled between said control electrode of said fourth transistor and a terminal at which is supplied said ground reference potential; and second resistive means coupled between said control electrode of said second transistor and a terminal at which is supplied said ground reference potential.

* * * * *